United States Patent
Rosenberg

(12)
(10) Patent No.: US 6,243,078 B1
(45) Date of Patent: *Jun. 5, 2001

(54) POINTING DEVICE WITH FORCED FEEDBACK BUTTON

(75) Inventor: Louis B. Rosenberg, San Jose, CA (US)

(73) Assignee: Immersion Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,132

(22) Filed: Feb. 18, 1999

Related U.S. Application Data

(63) Continuation-in-part of application No. 09/156,802, filed on Sep. 17, 1998, and a continuation-in-part of application No. 09/103,281, filed on Jun. 23, 1998.

(51) Int. Cl.$^7$ ................................................ G09G 5/08
(52) U.S. Cl. ............................................................. 345/161
(58) Field of Search .................................... 345/161, 163, 345/156, 157, 160, 158

(56) References Cited

U.S. PATENT DOCUMENTS

| | | | |
|---|---|---|---|
| 3,919,691 | 11/1975 | Noll | 340/172.5 |
| 4,604,016 | 8/1986 | Joyce | 474/7 |

(List continued on next page.)

FOREIGN PATENT DOCUMENTS

| | | |
|---|---|---|
| 0085518A1 | 1/1983 | (EP) . |
| 0265011 | 4/1988 | (EP) . |
| 0607580A1 | 7/1994 | (EP) . |
| 062664A2 | 11/1994 | (EP) . |
| 875819 | 4/1998 | (EP) ................................. G06F/3/00 |
| 92/00559 | 1/1992 | (WO) . |
| 95/20788 | 8/1995 | (WO) ................................ G06F/3/00 |
| 95/32459 | 11/1995 | (WO) ................................ G06F/3/00 |

(List continued on next page.)

OTHER PUBLICATIONS

Dennerlein et al., "Vibrotactile Feedback for Industrial Telemanipulators," 1997, Sixth Annual Symp. On Haptic Interfaces for Virtual Env. and Teleoperator Systems, ASME IMECE, Dallas, pp. 1–7.

(List continued on next page.)

*Primary Examiner*—Richard Hjerpe
*Assistant Examiner*—Ronald Laneau
(74) *Attorney, Agent, or Firm*—James R. Riegel

(57) ABSTRACT

A low-cost force feedback interface device for providing low cost force feedback for enhancing interactions and manipulations in a graphical environment provided by a computer. One embodiment provides a mouse movable in a planar workspace and providing output sensor signals representative of that movement. Mouse button movement is detected to send command signals to the host computer, and an actuator coupled to the button applies an output force in the degree of freedom of the button. In a different embodiment, a force feedback pointing device includes a cylindrical member that may be rotated about an axis and translated along that axis to provide sensor signals to control a position of a graphical object such as a cursor. A command sensor detects motion of the cylindrical member perpendicular to the translation, such as when the cylindrical member is pressed down by the user. An actuator applies an output force in the perpendicular degree of freedom of the cylindrical member. The output force is correlated with interaction of the controlled cursor with other graphical objects in the graphical environment. The force sensation can be a jolt, vibration, constant force, texture force, or other type of force.

36 Claims, 5 Drawing Sheets

U.S. PATENT DOCUMENTS

| | | | |
|---|---|---|---|
| 4,782,327 | 11/1988 | Kley et al. | 340/365 |
| 4,794,384 | 12/1988 | Jackson | 340/710 |
| 4,795,296 | 1/1989 | Jau | 414/5 |
| 4,839,838 | 6/1989 | LaBiche et al. | 364/709.11 |
| 4,868,549 | 9/1989 | Affinito et al. | 340/710 |
| 4,896,554 | 1/1990 | Culver | 74/471 |
| 4,949,119 | 8/1990 | Moncrief et al. | 364/578 |
| 4,961,038 | 10/1990 | MacMinn | 318/696 |
| 4,983,901 | 1/1991 | Lehmer | 318/685 |
| 5,004,391 | 4/1991 | Burdea . | |
| 5,044,956 | 9/1991 | Behensky et al. | 434/45 |
| 5,076,517 | 12/1991 | Ferranti et al. | 244/228 |
| 5,095,303 | 3/1992 | Clark et al. | 340/710 |
| 5,103,404 | 4/1992 | McIntosh | 318/568.22 |
| 5,107,080 | 4/1992 | Rosen | 200/6 |
| 5,107,262 | 4/1992 | Cadoz et al. | 341/22 |
| 5,116,180 | 5/1992 | Fung et al. | 414/5 |
| 5,146,566 | 9/1992 | Hollis, Jr. et al. | 395/275 |
| 5,184,319 | 2/1993 | Kramer | 364/806 |
| 5,185,561 | 2/1993 | Good et al. | 318/432 |
| 5,186,629 | 2/1993 | Rohen | 434/114 |
| 5,189,355 | 2/1993 | Larkins et al. | 318/685 |
| 5,193,963 | 3/1993 | McAffee et al. | 414/5 |
| 5,197,003 | 3/1993 | Moncrief et al. | 364/410 |
| 5,203,563 | 4/1993 | Loper, III | 273/148 |
| 5,220,260 | 6/1993 | Schuler | 318/561 |
| 5,223,776 | 6/1993 | Radke et al. | 318/568.1 |
| 5,235,868 | 8/1993 | Culver | 74/471 |
| 5,275,565 | 1/1994 | Moncrief | 434/29 |
| 5,286,203 | 2/1994 | Fuller et al. | 434/45 |
| 5,296,871 | 3/1994 | Paley | 345/163 |
| 5,313,230 | 5/1994 | Venolia et al. . | |
| 5,354,162 | 10/1994 | Burdea et al. | 414/5 |
| 5,355,148 | 10/1994 | Anderson | 345/166 |
| 5,381,080 | 1/1995 | Schnell et al. | 318/566 |
| 5,396,266 | 3/1995 | Brimhall | 345/161 |
| 5,398,044 | 3/1995 | Hill | 345/145 |
| 5,405,152 | 4/1995 | Katanics et al. | 273/438 |
| 5,414,337 | 5/1995 | Schuler | 318/561 |
| 5,451,924 | 9/1995 | Massimino et al. | 340/407.1 |
| 5,457,479 | 10/1995 | Cheng | 345/163 |
| 5,459,382 | 10/1995 | Jacobus et al. | 318/568.11 |
| 5,473,344 | 12/1995 | Bacon et al. | 345/163 |
| 5,491,477 | 2/1996 | Clark et al. | 341/20 |
| 5,506,605 | 4/1996 | Paley . | |
| 5,512,919 | 4/1996 | Araki | 345/156 |
| 5,513,100 | 4/1996 | Parker et al. | 364/167.01 |
| 5,530,455 | 6/1996 | Gillick et al. | 345/163 |
| 5,565,887 | 10/1996 | McCambridge et al. | 345/145 |
| 5,576,727 | 11/1996 | Rosenberg et al. | 345/179 |
| 5,583,407 | 12/1996 | Yamaguchi | 318/551 |
| 5,589,828 | 12/1996 | Armstrong . | |
| 5,589,854 | 12/1996 | Tsai . | |
| 5,596,347 | 1/1997 | Robertson et al. | 345/145 |
| 5,625,576 | 4/1997 | Massie et al. | 364/578 |
| 5,642,469 | 6/1997 | Hannaford et al. | 395/99 |
| 5,643,087 | 7/1997 | Marcus et al. . | |
| 5,656,901 | 8/1997 | Kurita | 318/436 |
| 5,666,138 | 9/1997 | Culver | 345/161 |
| 5,691,747 | 11/1997 | Amano | 345/167 |
| 5,691,898 | 11/1997 | Rosenberg et al. | 364/190 |
| 5,694,013 | 12/1997 | Stewart et al. . | |
| 5,709,219 | 1/1998 | Chen et al. | 128/782 |
| 5,714,978 | 2/1998 | Yamanaka | 345/157 |
| 5,721,566 * | 2/1998 | Rosenberg et al. | 345/161 |
| 5,734,373 * | 3/1998 | Rosenberg et al. | 345/161 |
| 5,736,978 | 4/1998 | Hasser et al. | 345/173 |
| 5,739,811 * | 4/1998 | Rosenberg et al. | 345/156 |
| 5,742,278 | 4/1998 | Chen et al. | 345/156 |
| 5,745,715 | 4/1998 | Pickover et al. | 395/348 |
| 5,754,023 | 5/1998 | Rosten et al. | 318/561 |
| 5,755,577 | 5/1998 | Gillio | 434/262 |
| 5,757,358 | 5/1998 | Osga | 345/146 |
| 5,767,839 | 6/1998 | Rosenberg | 345/161 |
| 5,771,037 | 6/1998 | Jackson | 345/157 |
| 5,781,172 | 7/1998 | Engel et al. | 345/164 |
| 5,784,052 | 7/1998 | Keyson . | |
| 5,790,108 | 8/1998 | Salcudean et al. . | |
| 5,802,353 | 9/1998 | Avila et al. | 395/500 |
| 5,805,140 | 9/1998 | Rosenberg et al. | 345/161 |
| 5,808,603 | 9/1998 | Chen | 345/157 |
| 5,821,921 | 10/1998 | Osborn et al. . | |
| 5,825,308 | 10/1998 | Rosenberg | 341/20 |
| 5,831,408 | 11/1998 | Jacobus et al. | 318/568.11 |
| 5,844,392 | 12/1998 | Peurach et al. | 318/568.17 |
| 5,880,714 | 3/1999 | Rosenberg et al. | 345/156 |
| 5,889,670 | 3/1999 | Schuler et al. | 364/186 |
| 5,897,437 | 4/1999 | Nishiumi et al. . | |
| 5,912,661 | 6/1999 | Siddiqui | 345/166 |
| 5,914,705 | 6/1999 | Johnson et al. . | |
| 5,944,151 | 8/1999 | Jakobs et al. | 188/267.1 |
| 5,956,016 | 9/1999 | Kruenzner et al. . | |
| 5,956,484 | 9/1999 | Rosenberg et al. | 395/200.33 |
| 5,959,613 | 9/1999 | Rosenberg et al. | 345/161 |
| 5,973,689 | 10/1999 | Gallery . | |
| 5,990,869 | 11/1999 | Kubica et al. | 345/163 |
| 6,001,014 | 12/1999 | Ogata . | |
| 6,004,134 | 12/1999 | Marcus et al. . | |
| 6,088,017 | 6/2000 | Tremblay et al. . | |
| 6,088,019 | 6/2000 | Rosenberg . | |
| 6,100,874 | 8/2000 | Schena et al. . | |
| 6,128,006 | 10/2000 | Rosenberg . | |

FOREIGN PATENT DOCUMENTS

| | | |
|---|---|---|
| 96/28777 | 9/1996 | (WO) . |
| 97/12357 | 4/1997 | (WO) . |
| 97/21160 | 6/1997 | (WO) . |
| 97/31333 | 8/1997 | (WO) . |
| 98/08159 * | 2/1998 | (WO) . |
| 98/24183 * | 6/1998 | (WO) . |
| 98/58323 | 12/1998 | (WO) . |
| 2343499A | 12/1999 | (WO) . |
| 00/03319 | 1/2000 | (WO) . |
| 00/21071 | 4/2000 | (WO) . |

OTHER PUBLICATIONS

Kelley et al., "MagicMouse: Tactile and Kinesthetic Feedback in the Human—Computer Interface using an Electromagnetically Actuated Input/Output Device," Oct. 19, 1993 University of British Columbia pp. 1–27.

Kelley et al., "On the Development of a Force–Feedback Mouse and its Integration into a graphical user Interface," Nov. 1994, Engineering Congress and Exhibition, pp. 1–8.

Christophe Ramstein, "Combining Haptic & Braille Technologies: Design Issues and Pilot Study," 1996, Siggraph pp. 37–44.

Payette et al., "Evaluation of a Force Feedback (Haptic) Computer Printing Device in Zero Gravity," Oct. 17, 1996, ASME Dynamics Systems, vol. 58 pp. 547–553.

Wiker et al., "Development of Tactile Mice for Blind Access to Computers, Importance of Stimulation Locus, Object Size, and Vibrotactile Display Resolution," 1991, Human Factors Society Mtg., pp. 708–712.

Ellis et al., Design & Evaluation of a High–Performance Prototype Planar Haptic Interface, Dec. 1993, Advances in Robotics, 55–64.

Schmult et al., "Application Areas for a Force–Feedback Joystick," 1993, Advances in Robotics, vol. 49, pp. 47–54.

Adachi et al., "Sensory Evaluation of Virtual Haptic Push–Buttons," 1994, Suzuki Motor Corp., pp. 1–7.

Akamatsu et al., "Multimodal Mouse: A Mouse–Type Device with Tactile and Force Display," 1994, Presence vol. 3, pp. 73–80.

Su et al., "The Virtual Panel Architecture: A 3D Gesture Framework," University of Maryland, pp. 387–393.

Ramstein et al., "The Pantograph: A Large Workspace Haptic Device for a Multimodal Human—Computer Interaction," Computer—Human Interaction, CHI 1994, pp. 1–3.

Buttolo et al., "Pen–based force Display for Precision Manipulation in Virtual Environments," IEEE 0–8186–7084–3, 1995, pp. 217–224.

Hannaford et al., "Force–Feedback Cursor Control," NASA Tech Briefs, vol. 13, No. 11, 1989, pp. 1–7.

Rosenberg et al., "The use of force feedback to enhance graphical user intefaces," Stereoscopic Displays & Virtual Reality Systems, 1996, pp. 243–248.

Munch et al., "Intelligent Control for Haptic Displays," Eurographics '96, vol. 15, No. 3, 1996, pp. 217–226.

Rosenberg et al., "Commercially Viable force feedback Controller for Individuals with Neuromotor Disabilities," Armstrong Laboratory, AL/CF–TR–1997–0016, 1996, pp. 1–33.

Brooks, Jr. et al., "Project GROPE, Haptic Displays for Scientific Visualization,", Computer Graphics, vol. 24, #4, 1990, pp. 177–184.

Batter et al., "Grope–1: A computer Display to the sense of Feel," Proc IFIP Congress, 1971, pp. 759–763.

Gotow et al., "Perception of Mechanical Properties at the Man—Machine Interface," IEEE CH2503–1, 1987, pp. 688–690.

Howe et al., "Task Performance w/ a dextrous Teleoperated Hand System," Proc. of SPIE, vol. 1833, 1992, pp. 1–9.

Atkinson et al., "Computing with Feeling,", Comput. & Graphics, vol. 2, 1977, pp. 97–103.

Minsky et al., "Feeling & Seeing:Issues in Force Display," ACM089791–351–5, 1990, pp. 235–242, 270.

Millman et al., "Design of a 4 Degree of Freedom Force–Reflecting Manipulandum with a Specified Force/Torque Workspace," IEEE CH2969–4, 1991, pp. 1488–1493.

Winey III, "Computer Stimulated Visual & Tactile Feedback as an Aid to Manipulator & Vehicle Control," MIT, 1981, pp. 1–79.

Colgate et al., "Implementation of Stiff Virtual Walls in Force–Reflecting Interfaces," Northwestern University, IL, 1993., pp. 1–8.

Hirota et al., "Development of Surface Display," IEEE 0–7803–1363–1, 1993, pp. 256–262.

Rosenberg, "Perceptual Design of a Virtual Rigid Surface Contact," Armstrong Laboratory AL/CF–TR–1995–0029, 1993, pp. 1–45.

Iwata et al., "Artificial Reality w/ Force–Feedback: Development of Desktop Virtual Space with Compact Master Manipulator," Computer Graphics, vol. 24, No. 4, 1990, pp. 165–170.

Russo, "The Design & Implementation of a 3–Degree–of–Freedom Force Output Joystick," Dept. of Mech. Engineering, 1990, pp. 1–42.

Rosenberg, L., "Virtual fixtures as tools to enhance operator performance in telepresence environments," SPIE Manipulator Technology, 1993, pp. 1–12.

Rosenberg et al., "Perceptual Decomposition of Virtual Haptic Surfaces," Proc. IEEE Symposium on Research Frontiers in Virtual Reality, 1993, pp. 1–8.

Ouh–Young et al., "Creating an Illusion of Feel: Control Issues in Force Display," Univ. of N. Carolina, 1989, pp. 1–14.

Yokokoji et al., "What you can see is what you can feel," IEEE 0–8186–7295–1, 1996, pp. 46–54.

Rosenberg et al., "A Force Feedback Programming Primer," Immersion Corp., 1997, pp. 1–176.

Kilpatrick et al., "The Use of Kinesthetic Supplement in an Interactive Graphics System," University of North Carolina, 1976, pp. 1–172.

Iwata, Hiroo, "Pen–based Haptic Virtual Environment," IEEE 0–7803–1363–1, 1993, pp. 287–292.

Ouh–Young, Ming, "Force Display in Molecular Docking," Dissertation for University of N. Carolina, 1990, pp. 1–42.

Adelstein et al., "Design & Implementation of a Force Reflecting Manipulandum for Manual Control Research," 1992, NASA—Ames Research Center and MIT, pp. 1–26.

* cited by examiner

POINTING DEVICE WITH FORCED FEEDBACK BUTTON

CROSS REFERENCE TO RELATED APPLICATIONS

This application is a continuation-in-part of co-pending parent patent applications Ser. No. 09/156,802, filed Sep. 17, 1998 on behalf of Shahoian et al., entitled, "Improvements in Haptic Feedback Control Devices," and Ser. No. 09/103, 281, filed Jun. 23, 1998 on behalf of Louis Rosenberg, entitled, "Low Cost Force Feedback Device with Actuator for Non-Primary Axis," both assigned to the assignee of this present application, and both of which are incorporated by reference herein in their entirety.

BACKGROUND OF THE INVENTION

The present invention relates generally to interface devices for allowing humans to interface with computer systems, and more particularly to computer interface devices that allow the user to provide input to computer systems and allow computer systems to provide force feedback to the user.

A user can interact with an environment displayed by a computer to perform functions and tasks on the computer, such as playing a game, experiencing a simulation or virtual reality environment, using a computer aided design system, operating a graphical user interface (GUI), etc. Common human-computer interface devices used for such interaction include a joystick, mouse, trackball, steering wheel, stylus, tablet, pressure-sensitive sphere, or the like, that is connected to the computer system controlling the displayed environment. Typically, the computer updates the environment in response to the user's manipulation of a physical manipulandum such as a joystick handle or mouse, and provides visual and audio feedback to the user utilizing the display screen and audio speakers. The computer senses the user's manipulation of the user object through sensors provided on the interface device that send locative signals to the computer. For example, the computer displays a cursor or other graphical object in a graphical environment, where the location of the cursor is responsive to the motion of the user object.

In some interface devices, tactile and/or haptic feedback is also provided to the user, more generally known as "force feedback." These types of interface devices can provide physical sensations which are felt by the user manipulating a user manipulandum of the interface device. For example, the Logitech Wingman Force joystick controller from Logitech, Inc. or the Feelit Mouse from Immersion Corporation may be connected to a computer and provides forces in the degrees of freedom of motion of the joystick or mouse to a user of the controller. One or more motors or other actuators are coupled to the joystick or mouse and are connected to the controlling computer system. The computer system controls forces on the joystick or mouse in conjunction and coordinated with displayed events and interactions by sending control signals or commands to the actuators. The computer system can thus convey physical force sensations to the user in conjunction with other supplied feedback as the user is grasping or contacting the physical object of the interface device. For example, when the user moves the manipulatable object and causes a displayed cursor to interact with a different displayed graphical object, the computer can issue a command that causes the actuator to output a force on the physical object, conveying a feel sensation to the user.

One problem with current force feedback controllers in the home consumer market is the high manufacturing cost of such devices, which makes the devices expensive for the consumer. A large part of this manufacturing expense is due to the inclusion of multiple actuators and corresponding control electronics in the force feedback device. In addition, high quality mechanical and force transmission components such as linkages and bearings must be provided to accurately transmit forces from the actuators to the user manipulandum and to allow accurate sensing of the motion of the user object. These components are complex and require greater precision in their manufacture than many of the other components in an interface device, and thus further add to the cost of the device. A need therefore exists for a force feedback device that is lower in cost to manufacture yet offers the user force feedback to enhance the interaction with computer applications.

SUMMARY OF THE INVENTION

The present invention is directed to a low-cost interface device connected to a computer system, the interface device having a simple actuator for low cost force feedback for enhancing interactions and manipulations in a displayed graphical environment.

More specifically, the present invention relates to a force feedback interface device that is coupled to a host computer system which implements a host application program. In one embodiment, the force feedback device is a mouse that is physically contacted by a user and movable in a planar workspace. The mouse includes a sensor device able to detect the movement of said mouse in the planar workspace and to output sensor signals representative of that movement. A button is coupled to a housing of the mouse, and a sensor detects a position of the button, such that when the button is pressed by the user to a predetermined position, a command signal is sent to the host computer. An actuator coupled to the button of the mouse and operative to apply an output force in the degree of freedom of the button. Preferably, a linear voice coil actuator is used. The button sensor can be a contact switch or a continuous-range sensor. The output force is preferably correlated with interaction of a controlled cursor with other graphical objects in a graphical environment displayed by the host computer. The force can be a jolt, vibration, constant force, texture force, or other type of force.

In a different embodiment, a force feedback pointing device having a cylindrical member is described. The cylindrical member is physically contacted by a user and may be rotated about an axis and translated along that axis to provide sensor signals representative of the rotation and translation. The sensor signals are used by the host computer to control a position of a graphical object in a displayed graphical environment, such as a cursor. The rotation controls one axis of motion of the cursor, such as vertical, and the translation controls a second axis of motion of the cursor, such as horizontal. A command sensor is also provided that detects a motion of the cylindrical member in a degree of freedom approximately perpendicular to the translation, such that when the cylindrical member is pressed by the user to a predetermined position in the perpendicular degree of freedom, a command signal is sent to the host computer. Finally, an actuator applies an output force in the perpendicular degree of freedom of the cylindrical member. The output force is correlated with an interaction of the cursor with a different graphical object in the graphical environment.

The present invention advantageously provides a force feedback device that is significantly lower in cost than other types of force feedback devices and is thus quite suitable for home consumer applications. A single actuator can be provided that directly applies force in the degree of freedom of a button of a mouse or to the command gesture motion of a pointing device such as a cylinder. The actuator does not output force in a main sensed degree of freedom of the device, thus allowing sensors to read the position of the user object without substantial interference from forces and also simplifying the control of output forces. Furthermore, the actuator of the present invention can provide a variety of different types of force sensations to enhance the user's experience and interface with a computer application.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
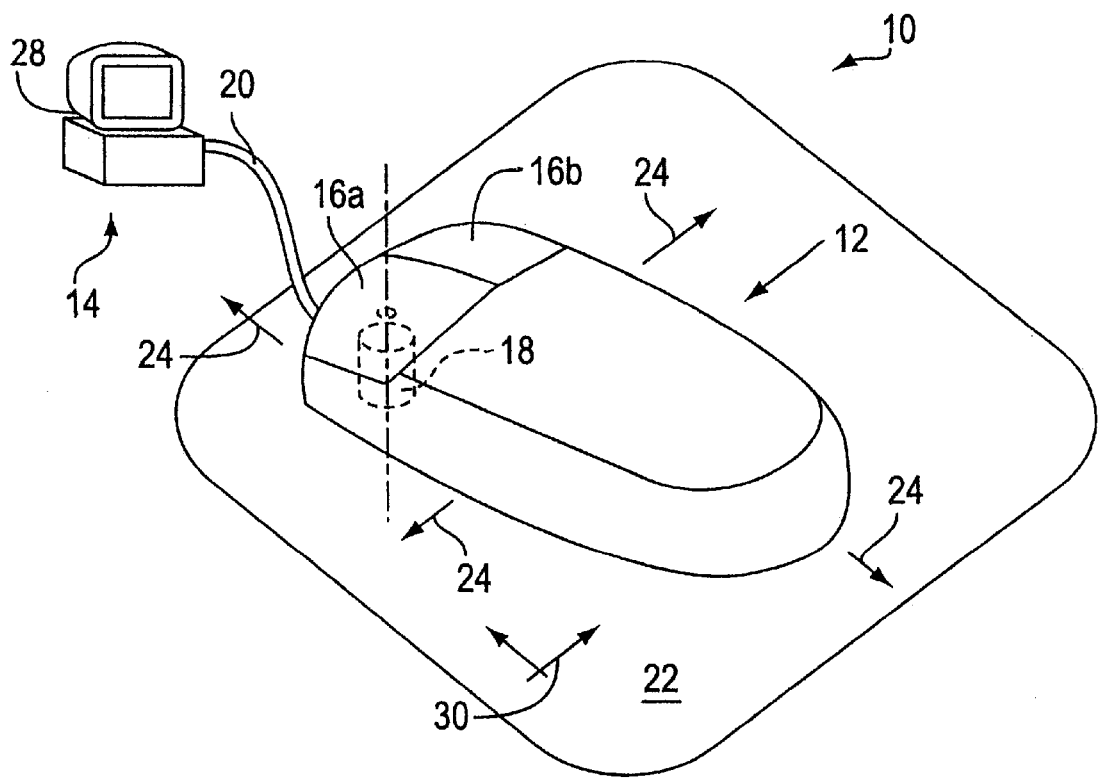
FIG. 1 is a perspective view of a mouse of the present invention connected to a host computer.

FIG. 1 is a perspective view of a force feedback mouse interface system 10 of the present invention capable of providing input to a host computer based on the user's manipulation of the mouse and capable of providing force feedback to the user of the mouse system based on events occurring in a program implemented by the host computer. Mouse system 10 includes a mouse 12 and a host computer 14. It should be noted that the term "mouse" as used herein, indicates an object generally shaped to be grasped or contacted from above and moved within a substantially planar workspace (and additional degrees of freedom if available). Typically, a mouse is a smooth or angular shaped compact unit that snugly fits under a user's hand, fingers, and/or palm, but can be implemented as a grip, finger cradle, cylinder, sphere, planar object, etc.

Mouse 12 is an object that is preferably grasped or gripped and manipulated by a user. By "grasp," it is meant that users may releasably engage a portion of the object in some fashion, such as by hand, with their fingertips, etc. In the described embodiment, mouse 12 is shaped so that a user's fingers or hand may comfortably grasp the object and move it in the provided degrees of freedom in physical space. For example, a user can move mouse 12 to provide planar two-dimensional input to a computer system to correspondingly move a computer generated graphical object, such as a cursor or other image, in a graphical environment provided by computer 14 or to control a virtual character, vehicle, or other entity in a game or simulation. In addition, mouse 12 preferably includes one or more buttons 16a and 16b to allow the user to provide additional commands to the computer system. The mouse 12 may also include additional buttons. For example, a thumb button can be included on one side of the housing of mouse 12.

Mouse 12 preferably includes an actuator 18 which is operative to produce forces on one or more buttons of the mouse 12. This operation is described in greater detail below with reference to FIG. 2.

Mouse 12 rests on a ground surface 22 such as a tabletop or mousepad. A user grasps the mouse 12 and moves the mouse in a planar workspace on the surface 22 as indicated by arrows 24. Mouse 12 may be moved anywhere on the ground surface 22, picked up and placed in a different location, etc. A frictional ball and roller assembly (not shown) is provided on the underside of the mouse 12 to translate the motion of the mouse 12 into electrical position signals, which are sent to a host computer 14 over a bus 20 as is well known to those skilled in the art. In other embodiments, different mechanisms can be used to convert mouse motion to position or motion signals received by the host computer.

Mouse 12 is coupled to the computer 14 by a bus 20, which communicates signals between mouse 12 and computer 14 and may also, in some preferred embodiments, provide power to the mouse 12. Components such as actuator 18 require power that can be supplied from a conventional serial port or through an interface such as a USB or Firewire bus. In other embodiments, signals can be sent between mouse 12 and computer 14 by wireless transmission/reception.

Host computer 14 is preferably a personal computer or workstation, such as a PC compatible computer or Macintosh personal computer, or a Sun or Silicon Graphics workstation. For example, the computer 14 can operate under the Windows™, MacOS, Unix, or MS-DOS operating system. Alternatively, host computer system 14 can be one of a variety of home video game systems commonly connected to a television set, such as systems available from Nintendo, Sega, or Sony. In other embodiments, host computer system 14 can be a "set top box" which can be used, for example, to provide interactive television functions to users, or a "network-" or "internet-computer" which allows users to interact with a local or global network using standard connections and protocols such as used for the Internet and World Wide Web. Host computer preferably includes a host microprocessor, random access memory (RAM), read only memory (ROM), input/output (I/O) circuitry, and other components of computers well-known to those skilled in the art.

Host computer 14 preferably implements a host application program with which a user is interacting via mouse 12 and other peripherals, if appropriate, and which may include force feedback functionality. For example, the host application program can be a simulation, video game, Web page or browser that implements HTML or VRML instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Unix, etc. are also referred to as "application programs." In one preferred embodiment, an application program utilizes a graphical user interface (GUI) to present options to a user and receive input from the user. Herein, computer 14 may be referred as displaying "graphical objects" or "computer objects." These objects are not physical objects, but are logical software unit collections of data and/or procedures that may be displayed as images by computer 14 on display screen 26, as is well known to those skilled in the art. A displayed cursor or a simulated cockpit of an aircraft might be considered a graphical object. The host application program checks for input signals received from the electronics and sensors of mouse 12, and outputs force values and/or commands to be converted into forces output for mouse 12. Suitable software drivers which interface such simulation software with computer input/output (I/O) devices are available from Immersion Human Interface Corporation of San Jose, Calif.

Display device 26 can be included in host computer 14 and can be a standard display screen (LCD, CRT, flat panel, etc.), 3-D goggles, or any other visual output device. Typically, the host application provides images to be displayed on display device 26 and/or other feedback, such as auditory signals. For example, display screen 26 can display images from a GUI.

As shown in FIG. 1, the host computer may have its own "host frame" 28 which is displayed on the display screen 26. In contrast, the mouse 12 has its own workspace or "local frame" 30 in which the mouse 12 is moved. In a position control paradigm, the position (or change in position) of a user-controlled graphical object, such as a cursor, in host frame 28 corresponds to a position (or change in position) of the mouse 12 in the local frame 30. The offset between the object in the host frame and the object in the local frame can be changed by the user by indexing, i.e., moving the mouse while no change in input is provided to the host computer, such as by lifting the mouse from a surface and placing it down at a different location.

In alternative embodiments, the force feedback provided to button 16a can be applied to buttons of other interface and control devices. For example, buttons of a hand-held remote control device used to select functions of a television, video cassette recorder, sound stereo, internet or network computer (e.g., Web-TV™), a gamepad controller for console video game systems, etc.

Figure 2:
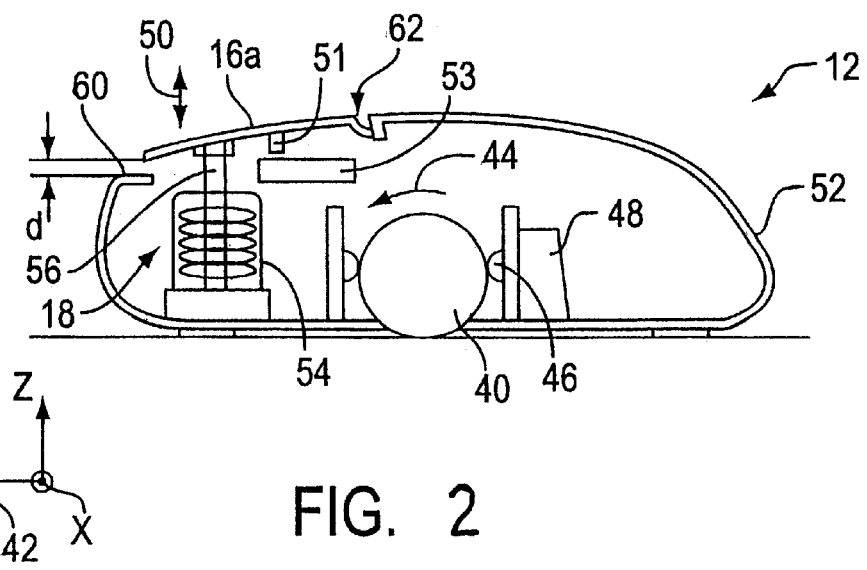
FIG. 2 is a side cross sectional view of the mouse of FIG. 1.

FIG. 2 is a side cross-sectional view of the mouse 12 of FIG. 1. In a preferred embodiment, mouse 12 includes a standard mouse ball 40 for providing directional input to the computer system. Ball 40 is a sphere that extends partially out the bottom surface of the mouse and rolls in a direction corresponding to the motion of the mouse on a planar surface 22. For example, when the mouse 12 is moved in a direction indicated by arrow 42 (y direction), the ball rotates in place in a direction shown by arrow 44. The ball motion is tracked by a cylindrical roller 46 which is coupled to a sensor 48 for detecting the motion of the mouse. A similar roller and sensor 28 is used for the x-direction which is perpendicular to the y-axis. Other types of mechanisms for detecting planar motion of the mouse 12 can be used in other embodiments; for example, an optical sensor can be built into the surface 22 to detect the position of an emitter or transmitter in mouse 12 and thus detect the position of the mouse 12 on the surface 22.

Buttons 16a and/or 16b are selected by the user as a "command gesture" when the user wishes to input a command signal to the host computer 14. The user pushes the button 16a down (in the degree of freedom of the button approximately along axis z) toward the actuator 18 to provide a command to the computer. The command signal, when received by the host computer, can manipulate the graphical environment in a variety of ways. For example, a graphical object positioned under the cursor such as an icon, button, slider thumb, menu item, or web link can be selected using the command gesture. Application programs can be executed or an action can be initiated in a game or simulation using the command gesture.

In one embodiment, an electrical lead 51 can be made to contact a sensing lead 53 as with any mechanical switch to determine a simple on or off state of the button. An optical switch or other type of digital sensor can alternatively be provided to detect a button press. In a different continuous-range button embodiment, a sensor can be used to detect the precise position of the button 16a in its range of motion (degree of freedom). For example, each position of the button can be sensed as a different analog value and used as an analog value or a digital value in processing the button position. This allows the host computer 14 (or local microprocessor) to determine the position of the button and to control a force output based on that position, as described in greater detail with respect to FIG. 4.

In the present invention, button 16a is actuated using actuator 18 for providing forces in a direction shown by arrow 50, which is approximately perpendicular to the plane of motion of the mouse 12, i.e. in the degree of freedom of button 16. Actuator 18 is preferably a linear electromagnetic actuator as described with reference to FIG. 3, but can be other types of actuators in other embodiments. Actuator 18 includes a stationary portion 54, such as a magnet, and a linearly-moving portion 56, such as a coil. In other embodiments, the stationary portion can be the coil and the moving portion can be the magnet. The stationary portion 54 is coupled to the housing 52 of the mouse 12, and the moving portion 56 is coupled to the button 16a to output force on the button 16a.

The actuator 18 can output a linear force that moves the button 16a up or down on the z-axis as shown by arrow 50. The button 16a can be pivotable at a hinge 62 which can be implemented in a variety of ways. For example, a flexible plastic between button 16a and housing 52 can act as a hinge, or a mechanical rotatable hinge can be used. The button 16a preferably has a limit to motion down provided by a stop 60, which can be part of or coupled to the housing 52. The button 16a can thus move a distance d from a rest position to the lowest position before the stop prevents further movement. In some embodiments, the button 16a can also have a stop limiting upward travel away from the housing 52 to a desired distance. A mechanical spring can also be included for button 16a, for example, to bias the button toward its rest position (if the hinge 62 does not perform that function). Alternatively, a repulsive magnet pair can be used to perform the same function as the mechanical spring.

Button 16b (see FIG. 1) can also (or alternatively) be provided with forces in other embodiments. For example, a single actuator 18 can provide forces simultaneously to both buttons 16a and 16b by coupling the moving portion 56 to both buttons. Alternatively, each button 16 can be provided with its own actuator, so that two actuators 18 are included in mouse 12. Furthermore, additional buttons can be included and can be similarly provided with forces, such as a third button between buttons 16a and 16b, a thumb wheel having button capability, and/or one or more thumb buttons provided on the side of the housing 52 of the mouse 12. In some embodiments, the actuator 18 also includes a physical spring which biases the button 16a to a position different than rest position shown in FIG. 2. In an alternate embodiment, the actuator 18 can be a rotary actuator that outputs a rotational force (torque) on hinge 62 to apply force on the button in a rotary degree of freedom (which may appear to the user to be a linear degree of freedom due to the small range of motion of the button 16a).

In other embodiments, the button force feedback as described above can be combined with an embodiment that provides an actuator to apply force to a portion of the housing 52, such as a pivotable top portion of the housing. Such an embodiment is described in greater detail in co-pending application Ser. No. 09/103,281, incorporated herein by reference.

Figure 3:
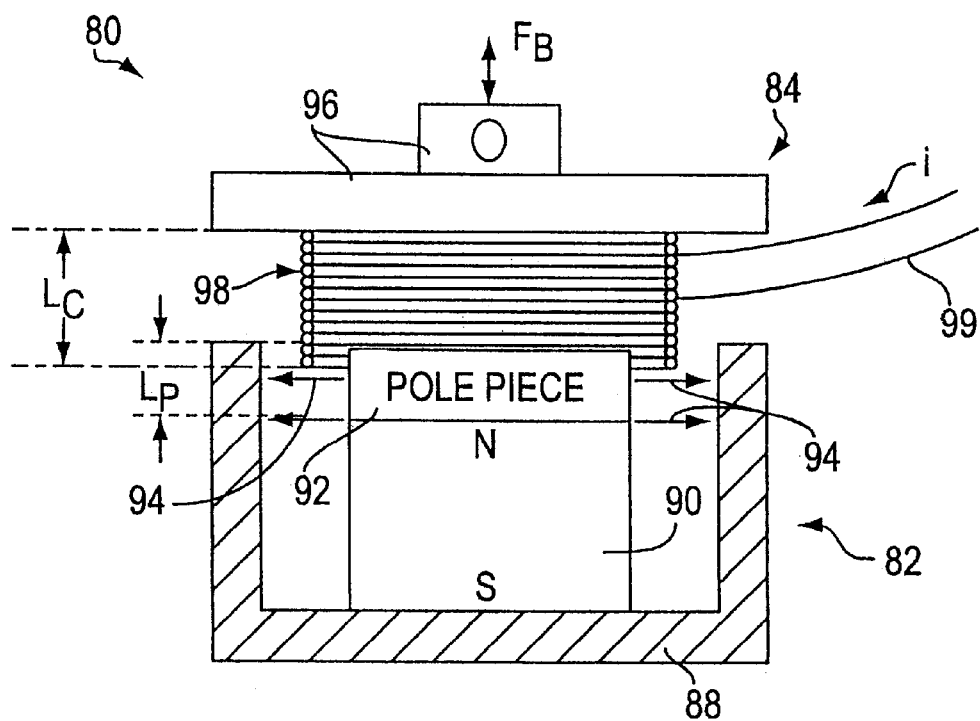
FIG. 3 is a side elevational view of a voice coil actuator suitable for use with the present invention.

FIG. 3 is a schematic view of a one embodiment 80 of actuator 18 suitable for use with the present invention. Actuator 80 is a voice coil actuator that includes a magnet portion 82 (which is the stationary portion 54) and a bobbin 84 (which is the moving portion 56). The magnet portion 82 is grounded and the bobbin 84 is moved relative to the magnet portion. In other embodiments, the bobbin 84 can be grounded and the magnet portion 82 can be moved. Magnet portion 82 includes a housing 88 made of a metal such as steel. A magnet 90 is provided within the housing 88 and a pole piece 92 is positioned on magnet 90. Magnet 90 provides a magnetic field 94 that uses steel housing 88 as a flux return path. Pole piece 92 focuses the flux into the gap between pole piece 92 and housing 88. The length of the pole piece 92 is designated as $L_P$ as shown. The housing 88, magnet portion 82, and bobbin 84 are preferably cylindrically shaped, but can also be provided as other shapes in other embodiments.

Bobbin 84 is operative to move linearly with respect to magnet portion 88. Bobbin 84 includes a support member 96 and a coil 98 attached to the support member 96. The coil is preferably wound about the support member 96 in successive loops. The mouse button 16a is coupled to the support member 96. The length of the coil is designated as $L_C$ in FIG. 3. When the bobbin is moved, the coil 98 is moved through the magnetic field 94. An electric current I is flowed through the coil 98 via electrical connections 99. As is well known to those skilled in the art, the electric current in the coil generates a magnetic field. The magnetic field from the coil then interacts with the magnetic field 94 generated by magnet 90 to produce a force. The magnitude or strength of the force is dependent on the magnitude of the current that is applied to the coil and the strength of the magnetic field. Likewise, the direction of the force depends on the direction of the current in the coil. The operation and implementation of force using magnetic fields is well known to those skilled in the art. One example of voice coil actuators is provided in U.S. Pat. No. 5,805,140, which is incorporated herein by reference.

The length of coil $L_C$ and length of pole piece $L_P$ can be adjusted to suit a particular application. For example, to provide a long stroke of bobbin 96 and an approximately constant force to be output over the linear range of motion of the bobbin, the length of coil $L_C$, is greater than the length of the pole piece $L_P$, such as two to three times greater. However, in most embodiments, only a short stroke of bobbin 96 is required, and the coil length $L_C$ can be made close to or the same as the length of the pole piece $L_P$.

Actuator 80 is a low cost, low power component that is well suited to the low cost embodiment of the present invention. Actuator 80 has a high bandwidth and a small range of motion as required by the present invention. In other embodiments, different types of actuators can be used. For example, linear voice magnet, linear solenoid, DC current controlled linear motor, a linear stepper motor controlled with pulse width modulation of an applied voltage, a pneumatic/hydraulic actuator, a torquer (motor with limited angular range), etc. Also, passive actuators can be used, such as magnetic particle brakes or fluid-controlled passive actuators. In yet other embodiments, a rotary actuator can be used to output a torque in a rotary degree of freedom on a shaft, which is converted to linear force and motion through a transmission, as is well known to those skilled in the art.

Figure 4:
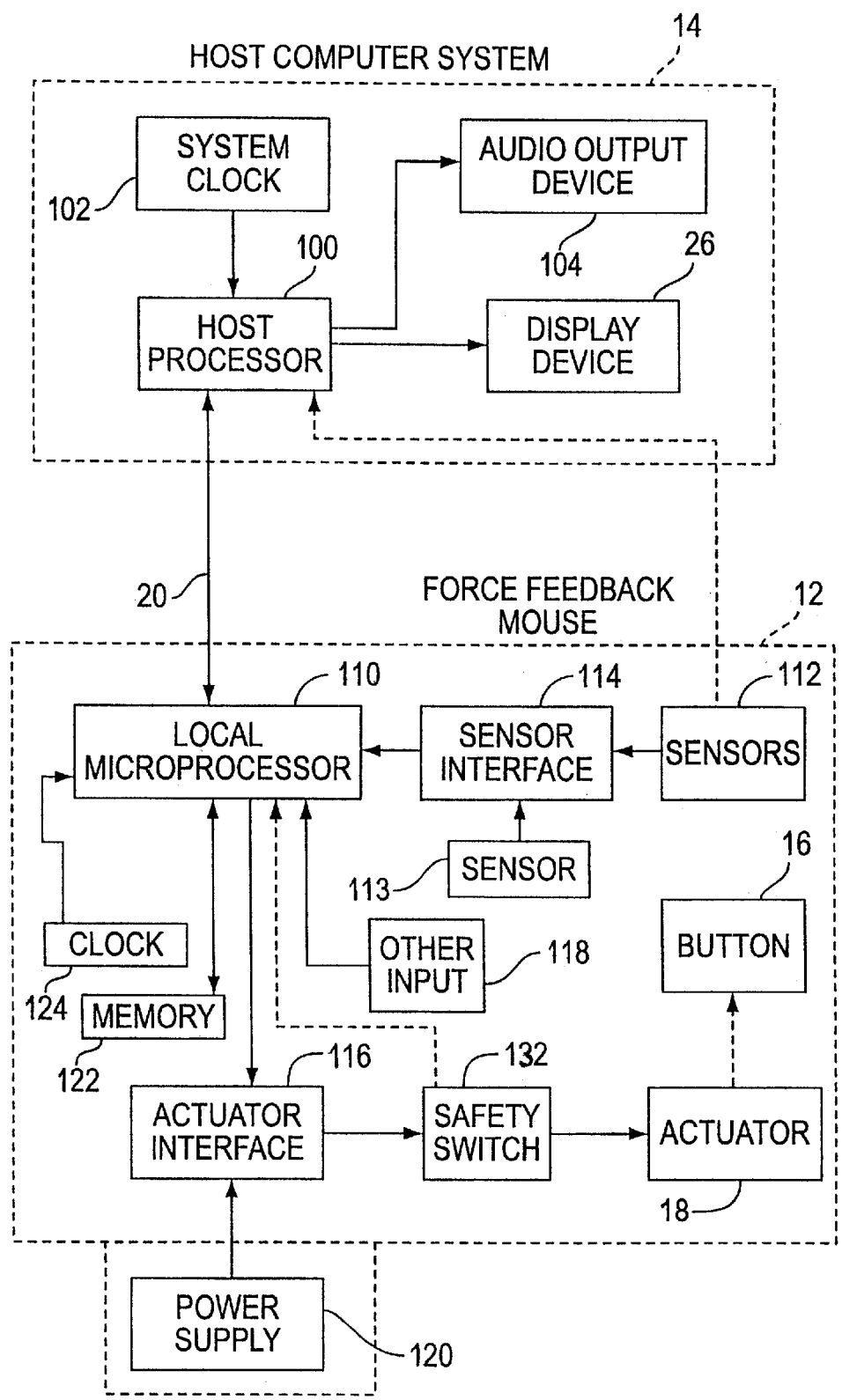
FIG. 4 is a block diagram of the mouse and host computer of the present invention.

FIG. 4 is a block diagram illustrating one embodiment of the force feedback system of the present invention including a local microprocessor and a host computer system.

Host computer system 14 preferably includes a host microprocessor 100, a clock 102, a display screen 26, and an audio output device 104. The host computer also includes other well known components, such as random access memory (RAM), read-only memory (ROM), and input/output (I/O) electronics (not shown). Display screen 26 displays images of a simulation, game environment, operating system application, etc. Audio output device 104, such as speakers, is preferably coupled to host microprocessor 100 via amplifiers, filters, and other circuitry well known to those skilled in the art and provides sound output to user when an "audio event" occurs during the implementation of the host application program. Other types of peripherals can also be coupled to host processor 100, such as storage devices (hard disk drive, CD ROM drive, floppy disk drive, etc.), printers, and other input and output devices.

Mouse 12 is coupled to host computer system 14 by a bi-directional bus 20. The bi-directional bus sends signals in either direction between host computer system 14 and the interface device. Bus 20 can be a serial interface bus, such as an RS232 serial interface, RS-422, Universal Serial Bus (USB), MIDI, or other protocols well known to those skilled in the art; or a parallel bus or wireless link. For example, the USB standard provides a relatively high speed serial interface that can also provide power to actuator 18.

Mouse 12 includes a local microprocessor 110. Local microprocessor 110 can optionally be included within the housing of mouse 12 to allow efficient communication with other components of the mouse. Processor 110 is considered local to mouse 12, where "local" herein refers to processor 110 being a separate microprocessor from any processors in host computer system 14. "Local" also preferably refers to processor 110 being dedicated to force feedback and sensor I/O of mouse 12. Microprocessor 110 can be provided with software instructions to wait for commands or requests from computer host 14, decode the command or request, and handle/control input and output signals according to the command or request. In addition, processor 110 preferably operates independently of host computer 14 by reading sensor signals and calculating appropriate forces from those sensor signals, time signals, and stored or relayed instructions selected in accordance with a host command. Suitable microprocessors for use as local microprocessor 110 include the MC68HC711E9 by Motorola, the PIC16C74 by Microchip, and the 82930AX by Intel Corp., for example. Microprocessor 110 can include one microprocessor chip, multiple processors and/or co-processor chips, and/or digital signal processor (DSP) capability.

Microprocessor 110 can receive signals from sensor 112 and provide signals to actuator 18 in accordance with instructions provided by host computer 14 over bus 20. For example, in a local control embodiment, host computer 14 provides high level supervisory commands to microprocessor 110 over bus 20, and microprocessor 110 manages low level force control loops to sensors and the actuator in accordance with the high level commands and independently of the host computer 14. This operation is described in greater detail in U.S. Pat. Nos. 5,739,811 and 5,734,373, both incorporated by reference herein. In the host control loop, force commands are output from the host computer to microprocessor 110 and instruct the microprocessor to output a force or force sensation having specified characteristics. The local microprocessor 110 reports data to the host computer, such as locative data that describes the position of the mouse in one or more provided degrees of freedom. The data can also describe the states of buttons 16 and safety switch 132. The host computer uses the data to update executed programs. In the local control loop, actuator signals are provided from the microprocessor 110 to actuator 18 and sensor signals are provided from the sensor 112 and other input devices 118 to the microprocessor 110. Herein, the term "force sensation" refers to either a single force or a sequence of forces output by the actuator 18 which provide a sensation to the user. For example, vibrations, a single jolt, or a spring force are all considered force sensations. The microprocessor 110 can process inputted sensor signals to determine appropriate output actuator signals by following stored instructions. The force process can command distinct force sensations, such as vibrations, textures, jolts, or even simulated interactions between displayed objects. The sensor 112 provides sensor signals to the microprocessor 110 indicating a position (or other information) of the mouse in provided degrees of freedom. The microprocessor may use the sensor signals in the local determination of forces to be output on the user object, as well as reporting locative data derived from the sensor signals to the host computer.

In yet other embodiments, other hardware can be provided locally to mouse 12 to provide functionality similar to microprocessor 110. For example, a hardware state machine incorporating fixed logic can be used to provide signals to the actuator 18 and receive sensor signals from sensors 112, and to output force signals according to a predefined sequence, algorithm, or process. Techniques for implementing logic with desired functions in hardware are well known to those skilled in the art. Such hardware can be better suited to less complex force feedback devices, such as the device of the present invention.

In a different, host-controlled embodiment, host computer 14 can provide low-level force commands over bus 20, which are directly transmitted to the actuator 18. Host computer 14 thus directly controls and processes all signals to and from the mouse 12, e.g. the host computer directly controls the forces output by actuator 18 and directly receives sensor signals from sensor 112 and input devices 118. This embodiment may be desirable to reduce the cost of the force feedback device yet further, since no local microprocessor 110 or other processing circuitry need be included in the mouse. Furthermore, since only one actuator 18 can be used with forces not provided in the primary sensed degrees of freedom, the local control of forces by microprocessor 110 may not be necessary in the present invention to provide the desired quality of forces.

Local memory 122, such as RAM and/or ROM, is preferably coupled to microprocessor 110 in mouse 12 to store instructions for microprocessor 110 and store temporary and other data. For example, force profiles can be stored in memory 122, such as a sequence of stored force values that can be output by the microprocessor, or a look-up table of force values to be output based on the current position of the user object. In addition, a local clock 124 can be coupled to the microprocessor 110 to provide timing data, similar to system clock 18 of host computer 12; the timing data might be required, for example, to compute forces output by actuator 18 (e.g., forces dependent on calculated velocities or other time dependent factors). In embodiments using the USB communication interface, timing data for microprocessor 110 can be alternatively retrieved from the USB signal.

For example, it is preferable that host computer 14 send a "spatial representation" to the local microprocessor 110, which is data describing the locations of some or all the graphical objects displayed in a GUI or other graphical environment which are associated with forces and the types/characteristics of these graphical objects. The microprocessor can store such a spatial representation in local memory 122, and thus will be able to determine interactions between the user object and graphical objects (such as the rigid surface) independently of the host computer. In addition, the microprocessor can be provided with the necessary instructions or data to check sensor readings, determine cursor and target positions, and determine output forces independently of host computer 18. The host could implement program functions (such as displaying images) when appropriate, and synchronization commands can be communicated between the microprocessor and host 18 to correlate the microprocessor and host processes. Also, the local memory can store predetermined force sensations for the microprocessor that are to be associated with particular types of graphical objects. Alternatively, the computer 14 can directly send force feedback signals to the mouse 12 to generate forces on button 16.

Sensors 112 sense the position or motion of the mouse in its planar degrees of freedom and provides signals to microprocessor 110 (or host 14) including information representative of the position or motion. Sensors suitable for detecting planar motion of a mouse include digital optical encoders, as is well known to those skilled in the art. Linear optical encoders, potentiometers, optical sensors, velocity sensors, acceleration sensors, strain gauge, or other types of sensors can also be used, and either relative or absolute sensors can be provided. Optional Sensor interface 114 can be used to convert sensor signals to signals that can be interpreted by the microprocessor 110 and/or host computer system 14, as is well known to those skilled in the art.

Sensor 113 is used to detect the position of the button 16*a*. As explained above, sensor 113 can be a simple on/off detection switch to determine if the button has been pressed or not. Alternatively, a more sophisticated sensor, such as an analog potentiometer or optical encoder, can be used to determine the position of the button in its degree of freedom. Sensor 113 can alternatively be a force sensing switch to detect the amount of force applied to button 16*a*. Button 16*b* and/or any other buttons and controls can include sensors similar to sensor 113.

Actuator 18 transmits forces to one or more buttons 16 of the mouse as described above with reference to FIG. 2 in response to signals received from microprocessor 110 or host computer 14. Actuator 18 is provided to generate force approximately perpendicular to the planar degrees of freedom of motion of the mouse and thus the actuator 18 does not generate force in the primary degrees of freedom of motion of the mouse; actuator instead provides "informative" or "effect" forces that do not resist or assist motion. The sensors 112 detect the position/motion of the mouse 12 in its planar degrees of freedom, and this sensing is in no way affected by the output of forces by actuator 18. Alternate embodiments can employ additional actuators for providing forces in the planar degrees of freedom of the mouse 12. One such embodiment is described in co-pending application Ser. No. 08/965,720, filed Nov. 7, 1997, and incorporated herein by reference. Actuator interface 116 can be optionally connected between actuator 18 and microprocessor 110 to convert signals from microprocessor 110 into signals appropriate to drive actuator 18. Interface 38 can include power amplifiers, switches, digital to analog controllers (DACs), analog to digital controllers (ADCs), and other components, as is well known to those skilled in the art.

Other input devices 118 are included in mouse 12 and send input signals to microprocessor 110 or to host 14 when manipulated by the user. Such input devices include buttons 16 and can include additional buttons, dials, switches, scroll wheels, or other controls or mechanisms.

Power supply 120 can optionally be included in mouse 12 coupled to actuator interface 116 and/or actuator 18 to provide electrical power to the actuator or be provided as a separate component. Alternatively, power can be drawn from a power supply separate from mouse 12, or power can be received across a USB or other bus. Also, received power can be stored and regulated by mouse 12 and thus used when needed to drive actuator 18. For example, power can be stored over time in a capacitor or battery and then immediately dissipated to provide a jolt force to the button 16. A safety switch 122 can optionally be included to allow a user to deactivate actuator 18 for safety reasons. For example, the user must continually activate or close safety switch 132 during operation of mouse 12 to enable the actuator 18. If, at any time, the safety switch is deactivated (opened), power from power supply 120 is cut to actuator 18 (or the actuator is otherwise disabled) as long as the safety switch is opened. Embodiments include an optical switch, an electrostatic contact switch, a button or trigger, a hand weight safety switch, etc.

Figure 5:
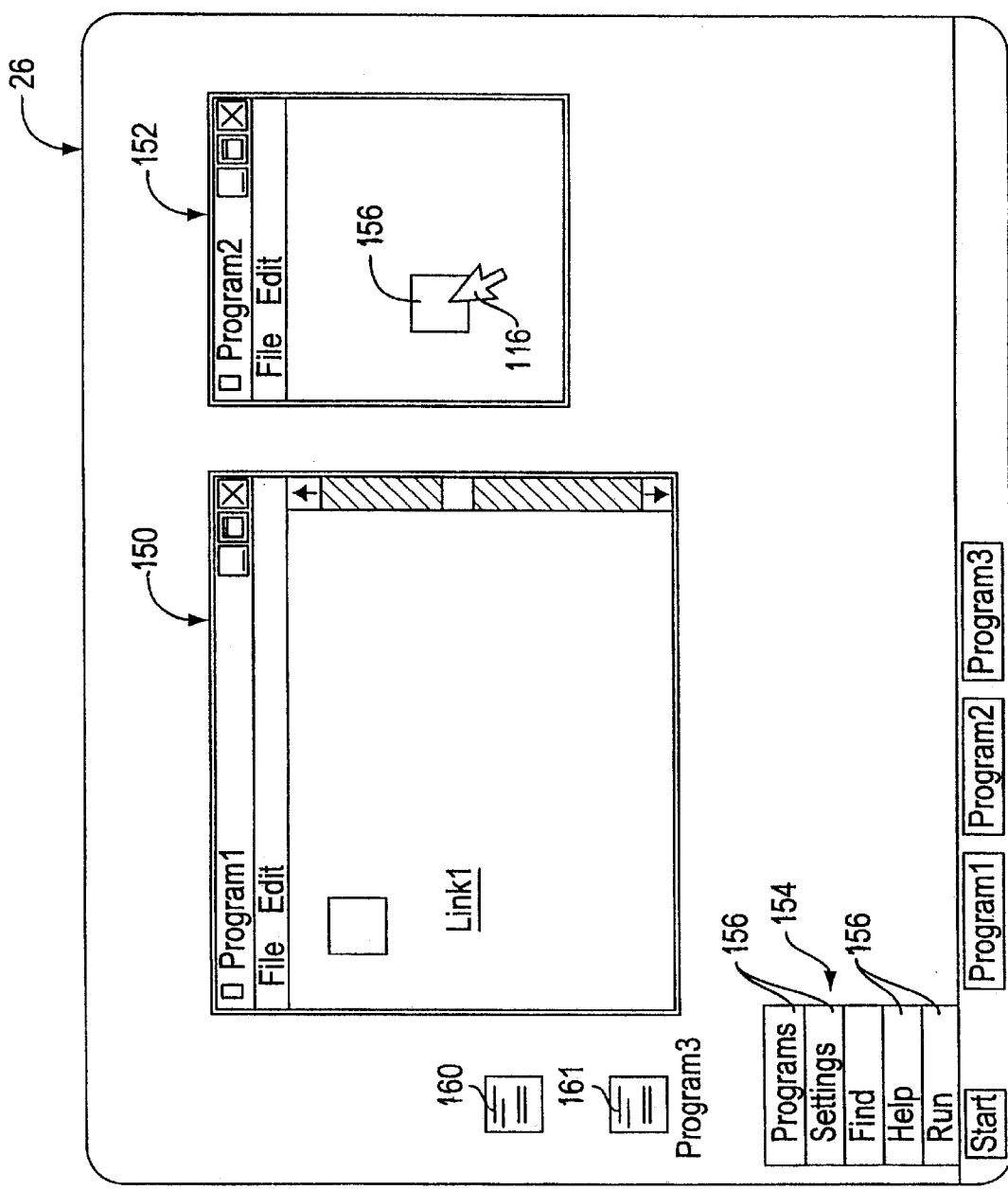
FIG. 5 is a diagrammatic view of a display screen showing graphical objects associated with force sensations output using the mouse of the present invention.

FIG. 5 is a diagram of display screen 26 of host computer 14 showing a graphical user interface for use with the present invention. The force feedback mouse of the present invention can provide force sensations that make interaction with the graphical objects more compelling and more intuitive. The user typically controls a cursor 146 to select and manipulate graphical objects and information in the graphical user interface. The cursor is moved according to a position control paradigm, where the position of the cursor corresponds to a position of the mouse in its planar workspace. Force sensations can be output using actuator 18 based on signals output from the local microprocessor or host computer.

For example, a jolt sensation can be output, which is a single impulse of force that quickly rises to the desired magnitude and then is turned off or quickly decays back to zero or small magnitude. A vibration can also be output, which is a time-varying force that is typically periodic, e.g. a force vs. time waveform that is shaped like a sine wave, triangle wave, or sawtooth wave. The vibration causes the button 16a to oscillate back and forth on the Z axis, and can be output by the microprocessor to simulate a particular effect that is occurring in a host application. A constant force can also be output on the user object. This is a force having a constant magnitude that is output for a specified period of time or until a condition occurs, such as a user-controlled cursor or graphical object being moved to a predefined location in a displayed graphical environment.

Another type of force sensation that can be output by actuator 18 is a texture force. This type of force is similar to a repeating jolt force, but depends on the position of the mouse in its planar workspace (or on the position of the cursor in the graphical user interface). Thus, texture bumps are output depending on whether the cursor has moved over the location of a bump in a graphical object. This type of force is spatially-dependent, i.e. a force is output depending on the sensed position of the mouse as it moves over a designated textured area; when the mouse is positioned between "bumps" of the texture, no force is output, and when the mouse moves over a bump, a force is output. Other spatial force sensations can also be output. In addition, any of the described force sensations herein can be output by actuator 18 simultaneously or otherwise combined as desired.

Windows 150 and 152 display information from application programs running on the host computer 14. Force sensations can output on the button 16a based on interaction between cursor 146 and a window. For example, a z-axis "bump" or jolt can be output on the button 16a when the cursor is moved over a border of a window 150 or 152 to signal the user of the location of the cursor. When the cursor 146 is moved within the window's borders, a texture force sensation can be output. The texture can be a series of bumps that are spatially arranged within the area of the window in a predefined pattern; when the cursor moves over a designated bump area, a bump force is output on the button 16a. A jolt or bump force can be output when the cursor is moved over a selectable object, such as a link 154 in a displayed web page or an icon 156. A vibration can also be output to signify a graphical object which the cursor is currently positioned over. Furthermore, features of a document displaying in window 150 or 152 can also be associated with force sensations. For example, a jolt can be output on button 16a when a page break in a document is scrolled past a particular area of the window. Page breaks or line breaks in a document can similarly be associated with force sensations such as jolts.

Menu 154 can be selected by the user after a menu heading or button such as start button 156 is selected. The individual menu items 156 in the menu can be associated with forces. For example, bumps can be output when the cursor is moved over the border between menu items 156. Icons 160 and 161 can be associated with textures, jolts, and vibrations similarly to the windows described above. Drawing or CAD programs also have many features which can be associated with force sensations, such as displayed (or invisible) grid lines or dots, control points of a drawn object, etc.

Another type of force sensation is a spring force provided by the actuator 18 rather than (or in addition to) force provided by a mechanical spring. The magnitude of this force sensation is dependent on the distance of the button from the origin of the spring. Thus, a more sophisticated sensor 113 is preferably used to sense the position of the button 16a in its degree of freedom. If the origin of the spring is at the rest position of the button, then the further the button is moved from the rest position, the greater the spring force opposing that motion. This force sensation can be associated with graphical objects and can be differentiated using magnitude. For example, when the user positions the cursor 146 over an icon 156 and presses the button, a light spring force resists the pressed motion of the button. When the user positions the cursor 146 over a different graphical object, such as icon 160, a heavy spring force is output having a greater magnitude than the spring force for icon 156.

Similar to the spring force, a "well" sensation can be output. When the cursor is positioned over a selectable graphical object, the button 16a can be mode to dip or move downward a slight amount as if the cursor were then at a lower elevation. This sensation can be used to indicate the status of a graphical object or to differentiate different graphical objects having different well "depths". In other embodiments having a button with a relatively large range of movement, a simulated 3-D surface can be simulated, where the button is moved to different elevations in correspondence with simulated elevations of graphical objects, displayed terrain features, etc.

Furthermore, the magnitude of output forces can depend on the event or interaction in the graphical environment. For example, the force jolt can be a different magnitude of force depending on the type of graphical object encountered by the cursor. For example, a jolts of higher magnitude can be output when the cursor moves over windows, while jolts of lower magnitude can be output when the cursor moves over icons. The magnitude of the jolts can also depend on other characteristics of graphical objects, such as an active window as distinguished a background window, file folder icons of different priorities designated by the user, icons for games as distinguished from icons for business applications, different menu items in a drop-down menu, etc.

User-independent events can also be relayed to the user using force sensations. An event occurring within the graphical user interface, such as an appointment reminder, receipt of email, etc., can be signified using a vibration, jolt, or other time-based force. The force sensation can be varied to signify different events of the same type. For example, vibrations of different frequency can each be used to differentiate different events or different characteristics of events, such as particular users sending email, the priority of an event, or the initiation or conclusion of particular tasks (e.g. the downloading of a document or data over a network).

The above-described force sensations can also be used in games or simulations where the mouse 12 is used as the primary input device. For example, a vibration can be output when a user-controlled racing car is driving on a dirt shoulder of a displayed road, and a jolt can be output when the car collides with another object. The magnitude of jolts can be based on the severity of a collision or explosion, the size of the controlled graphical object or entity (and/or the size of a different graphical object/entity that is interacted with), the velocity or acceleration of the mouse 12, etc. Force sensations can also be output based on user-independent events in the game or simulation, such as jolts when bullets are fired at the user's character.

Figure 6A:
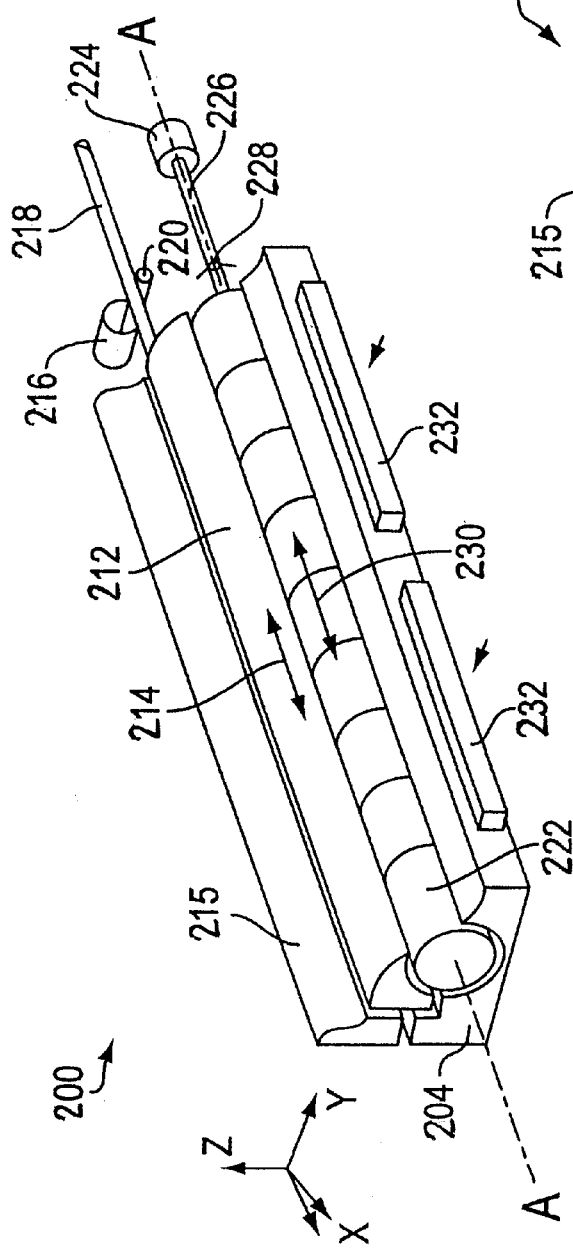
FIGS. 6a and 6b are perspective and side elevational views, respectively, of a second pointing device of the present invention providing low cost force feedback.
Figure 6B:
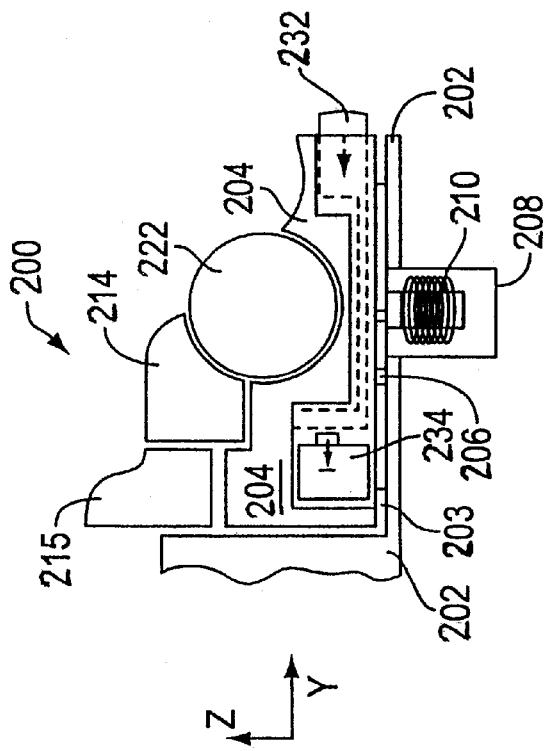

FIGS. 6a and 6b are perspective and side views, respectively, of another embodiment 200 of the force feedback pointing device of the present invention. In this embodiment, a cylinder controller is provided for a user to control a cursor or other graphical object or entity displayed on a computer screen. Controller 200 is preferably coupled to a host computer 14 as shown in FIG. 1 by a interface bus similar to bus 20 described above. Controller 200 can be mounted on a grounded surface or base 202, which can be a keyboard housing allowing easy access to the controller when operating the keyboard. Or the surface can be a different base separate from the keyboard.

A switchbar 204 is flexibly coupled to the base 202 at a leg 203 so as to allow the switchbar to flex downward toward the base 202. A contact switch 206 is provided on the base 202 and detects when the switchbar 204 is pressed downward by the user. Switch 206 can be any type of sensor as described for sensor 113 above. In addition, an actuator 208 is provided having a grounded portion 210 coupled to the base 202 (or ground) and a moving portion 212 coupled to the switchbar 204. Actuator 208 is similar to actuator 18 described above, and can output forces on the switchbar in the degree of freedom along the Z axis, similar to the mouse button 16. A local microprocessor 110 and the other components of FIG. 4 may also be included for embodiment 200.

A bar 212 is slidably coupled to the base 202 and may translate left and right along the x-axis as shown by arrow 214. The movement of bar 212 may be detected using a grounded sensor 216 which detects the motion of a member 218 that is rigidly coupled to the bar 214 and which is frictionally engaged with a rotating wheel 220 coupled to the sensor shaft. Barrier bar 215 is provided as a stationary surface with respect to the base 202. A cylinder 222 is rotatably coupled between the base 202 and the switchbar 202, and is preferably journalled in a U-shaped groove in the switchbar 202. Cylinder 222 may rotate about axis A as shown by arrow 228 and may also translate along axis A parallel to the x-axis as shown by arrow 230. The rotation of cylinder 222 can be detected by a sensor 224 that is connected to the cylinder 222 by a shaft 226. The cylinder 222 can be provided with a member and sensor (not shown) similar to sensor 216 and member 218 to measure translatory movement of the cylinder shown by arrow 230.

Controller 200 is preferably used as a pointing device to control the position of a cursor or other graphical object on a display device. In a preferred embodiment, the rotation of cylinder 222 causes a user-controlled cursor displayed by the computer 14 to be moved vertically in the host frame (on the computer screen), while translation of bar 214 or cylinder 222 causes the cursor to be moved horizontally in the host frame. Preferably, bar 214 can be translated independently of cylinder 222 to allow horizontal motion of the cursor without undesired vertical motion. The operation and structure of controller 200 to control a cursor is described in greater detail with respect to U.S. Pat. Nos. 4,896,554 and 5,235,868 of Culver, incorporated herein by reference.

Furthermore, the base 202 is preferably pressed downward by the user as a command gesture to send a command signal to the computer with similar effect as if a mouse button had been pressed as described above. Thus, if the user presses on base 202 directly, or presses on bar 214, barrier bar 215, or cylinder 222 to indirectly cause the base 202 to activate switch 206, then a signal is sent to the host computer or local microprocessor. Buttons 232 can also be pressed by the user as second and third buttons to provide additional input signals to the host computer, as detected by switch 234. These buttons can be provided with force feedback, if desired, using an actuator similar to actuator 208, for example.

Using the actuator 18, forces can be output on base 202, cylinder 222, and bar 214 similar to the forces output on mouse button 16a as described with respect to FIG. 5. This allows bumps, jolts, textures, and other force sensations to enhance the user's interaction with graphical objects in a graphical user interface, game, or simulation while using the controller 200 at a low cost and complexity. In alternate embodiments, force feedback can also be added to one or more of the other degrees of freedom for the control of the cursor as shown by arrows 214, 228, and 230.

While this invention has been described in terms of several preferred embodiments, it is contemplated that alterations, permutations and equivalents thereof will become apparent to those skilled in the art upon a reading of the specification and study of the drawings. For example, many different types of force sensations can be provided with the actuator of the present invention. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A force feedback mouse coupled to a host computer implementing a host application program, said mouse physically contacted by a user and movable in a planar workspace, the mouse comprising:

a sensor device coupled to a housing of said mouse, said sensor device detecting said movement of said mouse in said planar workspace and to output sensor signals representative of said movement;

a button coupled to said housing of said mouse and having a degree of freedom and a sensor for detecting a position of said button, such that when said button is pressed by said user to a predetermined position, a command signal is sent to said host computer;

a microprocessor-controlled actuator coupled to said button of said mouse, said actuator operative to apply an output spring force in said degree of freedom of said button; and a microprocessor local to said force feedback mouse and separate from said host computer and coupled to said sensor device and to said actuator, said microprocessor receiving a command from said host computer that causes said microprocessor to control said actuator to create said spring force in said degree of freedom of said button, said spring force having a magnitude specified by said command.

2. A force feedback mouse as recited in claim 1 wherein a grounded portion of said actuator is coupled to said housing of said mouse and a moving portion of said actuator is coupled to said button.

3. A force feedback mouse as recited in claim 1 wherein said actuator is a linear actuator that applies a linear output force in said degree of freedom of said button.

4. A force feedback mouse as recited in claim 3 wherein said linear actuator is a voice coil actuator.

5. A force feedback mouse as recited in claim 1 wherein said sensor includes a contact switch for detecting a depressed position of said button.

6. A force feedback mouse as recited in claim 1 wherein said sensor detects a range of at least three positions of said button in said degree of freedom of said button.

7. A force feedback mouse as recited in claim 6 wherein said output force is dependent, at least in part, on said position of said button in said degree of freedom.

8. A force feedback mouse as recited in claim 1 wherein said output spring force is correlated with a graphical representation displayed by said host computer, wherein a position of said mouse in said planar workspace corresponds with a position of a cursor displayed in said graphical representation.

9. A force feedback mouse as recited in claim 1 wherein said magnitude of said spring force is dependent on a characteristic of said graphical object with which said cursor interacts.

10. A force feedback mouse as recited in claim 9 wherein said characteristic of said graphical object is a type of said graphical object, wherein said type includes one of an icon, a window, and a menu item.

11. A force feedback mouse as recited in claim 1 wherein said microprocessor is operative to receive said sensor signals from said sensors and report locative data to said host computer derived from said sensor signals and indicative of said movement of said mouse.

12. A force feedback mouse as recited in claim 1 wherein said microprocessor receives low-level force commands from said host computer, said low-level force commands being transmitted to said actuator to be output as forces.

13. A force feedback pointing device coupled to a host computer implementing a host application program, said pointing device physically contacted by a user and movable to provide input to said host computer, the pointing device comprising:

a cylindrical member operative to rotate about an axis and to translate along said axis;

a sensor device coupled to said cylindrical member operative to detect said rotation and said translation of said cylindrical member and to output sensor signals representative of said rotation and said translation, wherein said sensor signals are used by said host computer to control a position of a graphical object in a displayed graphical environment;

a command sensor for detecting a motion of said cylindrical member in a degree of freedom approximately perpendicular to said translation, such that when said cylindrical member is pressed by said user to a predetermined position in said perpendicular degree of freedom, a command signal is sent to said host computer; and an actuator coupled to said cylindrical member and operative to apply a linear output force in said perpendicular degree of freedom of said cylindrical member, wherein said actuator receives a signal derived from a command sent from said host computer that causes said actuator to create a spring force in said degree of freedom of said cylindrical member, said spring force having a stiffness specified by said command.

14. A force feedback pointing device as recited in claim 13 wherein said actuator is a linear actuator.

15. A force feedback pointing device as recited in claim 14 further comprising a microprocessor local to said force feedback pointing device and separate from said host computer and coupled to said sensor device and to said actuator, said microprocessor receiving said command from said host computer that causes said microprocessor to control said actuator to create said spring force in said degree of freedom of said cylindrical member.

16. A force feedback pointing device as recited in claim 13 wherein said axis of said cylindrical member is approximately parallel to a horizontal plane, and wherein said rotation of said cylindrical member controls a vertical position and said translation of said cylindrical member controls a horizontal position of said graphical object in said graphical environment, said graphical object being a cursor.

17. A force feedback pointing device as recited in claim 13 wherein said command sensor is a contact switch.

18. A force feedback pointing device as recited in claim 13 wherein said command sensor is a continuous range sensor.

19. A force feedback pointing device as recited in claim 13 wherein said output force is correlated with an interaction of said cursor with a different graphical object in said graphical environment.

20. A force feedback pointing device as recited in claim 19 wherein said output force is a jolt or vibration force sensation.

21. A method for providing force feedback in a mouse input device coupled to a host computer, the method comprising:

outputting sensor signals to said host computer, said sensor signals representing a position of said mouse device in a planar workspace;

outputting a button signal to said host computer in response to a button on said mouse being moved by a user in a degree of freedom of said button; and outputting a jolt on said button in said degree of freedom of said button based on a host command sent to said mouse device from said host computer, said jolt correlated with the interaction of a user-controlled cursor with a graphical object displayed in a graphical user interface, said jolt including an impulse of force that rises to a maximum magnitude and then is reduced in magnitude or turned off, said impulse of force moving said button in said degree of freedom of said button.

22. A method as recited in claim 21 wherein said force is in a linear direction and is output by a linear actuator coupled to said mouse device.

23. A method as recited in claim 21 wherein said jolt is output on said button when said cursor is moved between two menu items in a displayed menu.

24. A method as recited in claim 21 wherein said jolt is output with a maximum magnitude dependent on a characteristic of said graphical object with which said cursor interacts.

25. A method as recited in claim 24 wherein said characteristic of said graphical object is a type of said graphical object, wherein said type includes one of an icon, a window, and a menu item.

26. A method as recited in claim 21 wherein said jolt is one of a plurality of jolts included in a vibration force sensation output to said user.

27. A force feedback mouse coupled to a host computer implementing a host application program, said mouse physically contacted by a user and movable in a planar workspace, the mouse comprising:
   a sensor device coupled to a housing of said mouse, said sensor device detecting said movement of said mouse in said planar workspace and to output sensor signals representative of said movement;
   a button coupled to said housing of said mouse and having a degree of freedom and a button sensor for detecting a position of said button, such that when said button is pressed by said user to a predetermined position, a command signal is sent to said host computer;
   an actuator coupled to said button of said mouse, said actuator operative to apply an output jolt in said degree of freedom of said button; and
   a microprocessor local to said force feedback mouse and separate from said host computer and coupled to said sensor device and to said actuator, said microprocessor receiving a command from said host computer that causes said microprocessor to control said actuator to create said jolt in said degree of freedom of said button, said jolt including an impulse of force that rises to a maximum magnitude and then is reduced in magnitude or turned off, said impulse of force moving said button in said degree of freedom of said button.

28. A force feedback mouse as recited in claim 27 wherein said jolt is one of a plurality of sequentially-output jolts included in a vibration force sensation output to said user.

29. A force feedback mouse as recited in claim 27 wherein said jolt is correlated with the interaction of a user-controlled cursor with a graphical object displayed in a graphical user interface.

30. A force feedback mouse as recited in claim 29 wherein said jolt is output with a maximum magnitude dependent on a characteristic of said graphical object with which said cursor interacts.

31. A force feedback mouse as recited in claim 29 wherein said jolt is output when said cursor moves between menu items in a displayed graphical menu.

32. A force feedback mouse as recited in claim 27 wherein a grounded portion of said actuator is coupled to said housing of said mouse and a moving portion of said actuator is coupled to said button.

33. A force feedback mouse as recited in claim 27 wherein said actuator is a linear actuator that applies a linear output force in said degree of freedom of said button.

34. A force feedback mouse as recited in claim 27 wherein said button sensor detects a range of at least three positions of said button in said degree of freedom of said button.

35. A force feedback mouse as recited in claim 27 wherein said output force is dependent, at least in part, on said position of said button in said degree of freedom.

36. A force feedback mouse in communication with a host computer providing a graphical environment, said mouse physically contacted by a user and movable in a planar workspace, the mouse comprising:
   a sensor device coupled to a housing of said mouse, said sensor device detecting said movement of said mouse in said planar workspace and to output sensor signals representative of said movement, wherein said host computer receives said sensor signals and displays a cursor in said graphical environment based on said sensor signals;
   a button coupled to said housing of said mouse and having a degree of freedom and a sensor for detecting a position of said button, such that when said button is pressed by said user to a predetermined position, a command signal is sent to said host computer;
   an actuator coupled to said button of said mouse, said actuator operative to apply an output bump force in said degree of freedom of said button; and
   a microprocessor local to said force feedback mouse and separate from said host computer and coupled to said sensor device and to said actuator, said microprocessor receiving a command from said host computer that causes said microprocessor to control said actuator to create said bump force in said degree of freedom of said button, wherein a plurality of said bump forces are output as a texture sensation when said cursor is moved over a texture area in said graphical environment.

\* \* \* \* \*